United States Patent
Sorrentino et al.

(10) Patent No.: US 7,827,282 B2
(45) Date of Patent: Nov. 2, 2010

(54) SYSTEM AND METHOD FOR PROCESSING HARDWARE OR SERVICE USAGE DATA

(75) Inventors: Anthony L. Sorrentino, Ballwin, MO (US); Michael S. Fischer, Ballwin, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 658 days.

(21) Appl. No.: 10/338,560

(22) Filed: Jan. 8, 2003

(65) Prior Publication Data

US 2004/0133680 A1  Jul. 8, 2004

(51) Int. Cl.
*G06F 15/173* (2006.01)

(52) U.S. Cl. ................ 709/226; 709/223; 709/224; 709/225; 718/101; 718/102; 718/103; 718/104; 718/105

(58) Field of Classification Search ................ 709/203, 709/223, 201, 226, 225, 224; 712/226; 717/174; 707/7, 8, 5, 40; 718/101, 105, 102, 103, 718/104

See application file for complete search history.

(56) References Cited

U.S. PATENT DOCUMENTS

| | | | |
|---|---|---|---|
| 4,967,341 A | 10/1990 | Yamamoto et al. | 364/200 |
| 5,003,460 A | 3/1991 | Flueter et al. | 364/200 |
| 5,089,985 A | 2/1992 | Chang et al. | 395/600 |
| 5,179,662 A | 1/1993 | Corrigan et al. | 395/250 |
| 5,210,870 A | 5/1993 | Baum et al. | 395/600 |
| 5,237,661 A | 8/1993 | Kawamura et al. | 395/250 |
| 5,333,310 A | 7/1994 | Sakai | 395/600 |
| 5,491,810 A | 2/1996 | Allen | 395/444 |
| 5,581,736 A | 12/1996 | Smith | 395/497.01 |
| 5,640,561 A | 6/1997 | Satoh et al. | 395/618 |
| 5,668,993 A | 9/1997 | Peters et al. | 395/671 |
| 5,724,584 A | 3/1998 | Peters et al. | 395/671 |

(Continued)

FOREIGN PATENT DOCUMENTS

CA    2235980    4/1998

OTHER PUBLICATIONS

Exotica/FMQM: A persistent Message-Based Architecture for Distributed Workflow Management, by G Alonso, C. Mohan, R. Gunter, Published by IFIP Working Conf, Trondheim, dated Aug. 1995.*

(Continued)

*Primary Examiner*—Nathan Flynn
*Assistant Examiner*—Mohammad A Siddiqi
(74) *Attorney, Agent, or Firm*—Jackson Walker L.L.P.

(57) ABSTRACT

A data processing system and method are disclosed. In an embodiment, the data processing system preferably maintains a plurality of substantially continuously available data processing service instances. The plurality of data processing service instances may be aggregated into groups of one or more instances of like data processing services. A service control manager is also preferably provided as an individual service running on the system and is operable to organize, manage and maintain the various service instances as well as other aspects of the data processing system. The service control manager preferably also cooperates with the individual services of a message queue manager, a service queue manager and an application services manager to effect the efficient distribution and processing of received data as well as perform other system management operations.

19 Claims, 5 Drawing Sheets

U.S. PATENT DOCUMENTS

| | | | |
|---|---|---|---|
| 5,799,210 A | 8/1998 | Cohen et al. | 395/876 |
| 5,913,164 A * | 6/1999 | Pawa et al. | 455/427 |
| 5,999,916 A | 12/1999 | Peters et al. | 705/34 |
| 6,128,623 A | 10/2000 | Mattis et al. | 707/103 |
| 6,137,874 A | 10/2000 | Brown et al. | 379/220 |
| 6,178,331 B1 * | 1/2001 | Holmes et al. | 455/466 |
| 6,295,575 B1 | 9/2001 | Blumenau et al. | 711/5 |
| 6,332,167 B1 | 12/2001 | Peters et al. | 709/318 |
| 6,381,640 B1 | 4/2002 | Beck et al. | 709/223 |
| 6,381,674 B2 | 4/2002 | DeKoning et al. | 711/113 |
| 6,393,112 B1 | 5/2002 | Gottlieb et al. | 379/112.01 |
| 6,447,665 B1 | 9/2002 | Johnson et al. | 205/203 |
| 6,449,695 B1 | 9/2002 | Bereznyi et al. | 711/134 |
| 6,490,722 B1 * | 12/2002 | Barton et al. | 717/174 |
| 6,725,032 B1 * | 4/2004 | Sheridan et al. | 455/419 |
| 6,763,520 B1 * | 7/2004 | Seeds | 718/101 |
| 2002/0007445 A1 | 1/2002 | Blumenau et al. | |
| 2002/0065694 A1 | 5/2002 | Peters et al. | |
| 2002/0078321 A1 | 6/2002 | Peters et al. | |
| 2004/0133731 A1 | 7/2004 | Sorrentino et al. | 711/100 |

OTHER PUBLICATIONS

Notification of Transmittal of International Search Report and the Written Opinion for International Application No. PCT/US04/00186 filed Jan. 7, 204, 13 pages, Mailed Aug. 19, 2004.

* cited by examiner

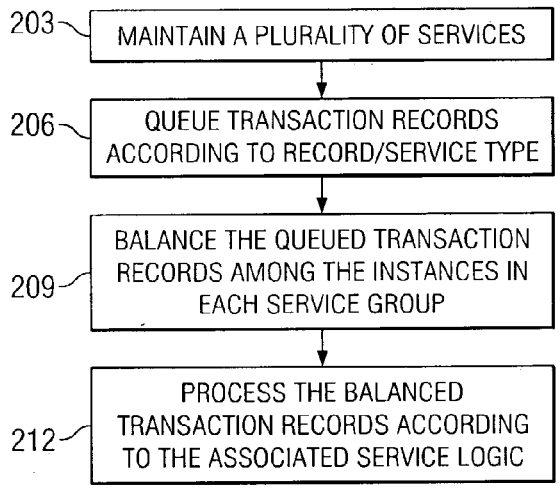
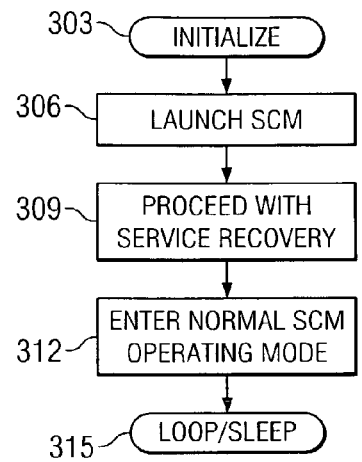
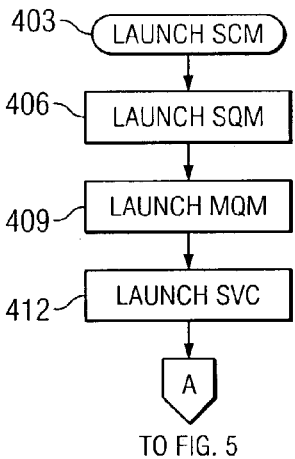
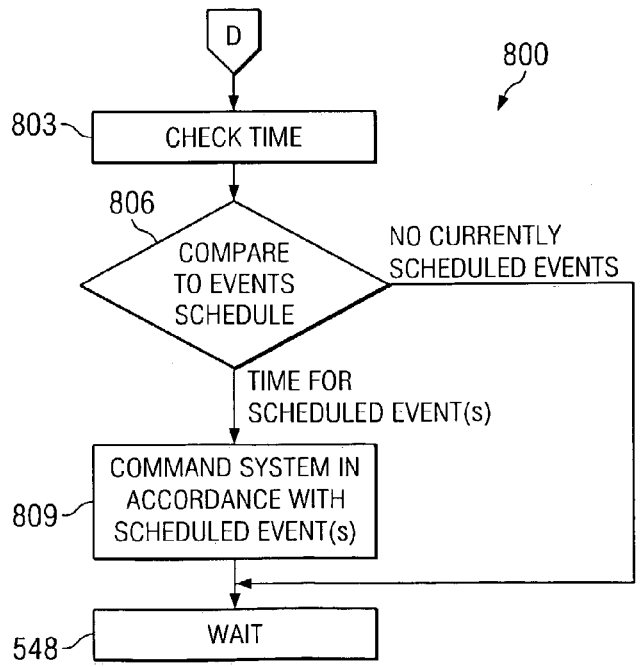

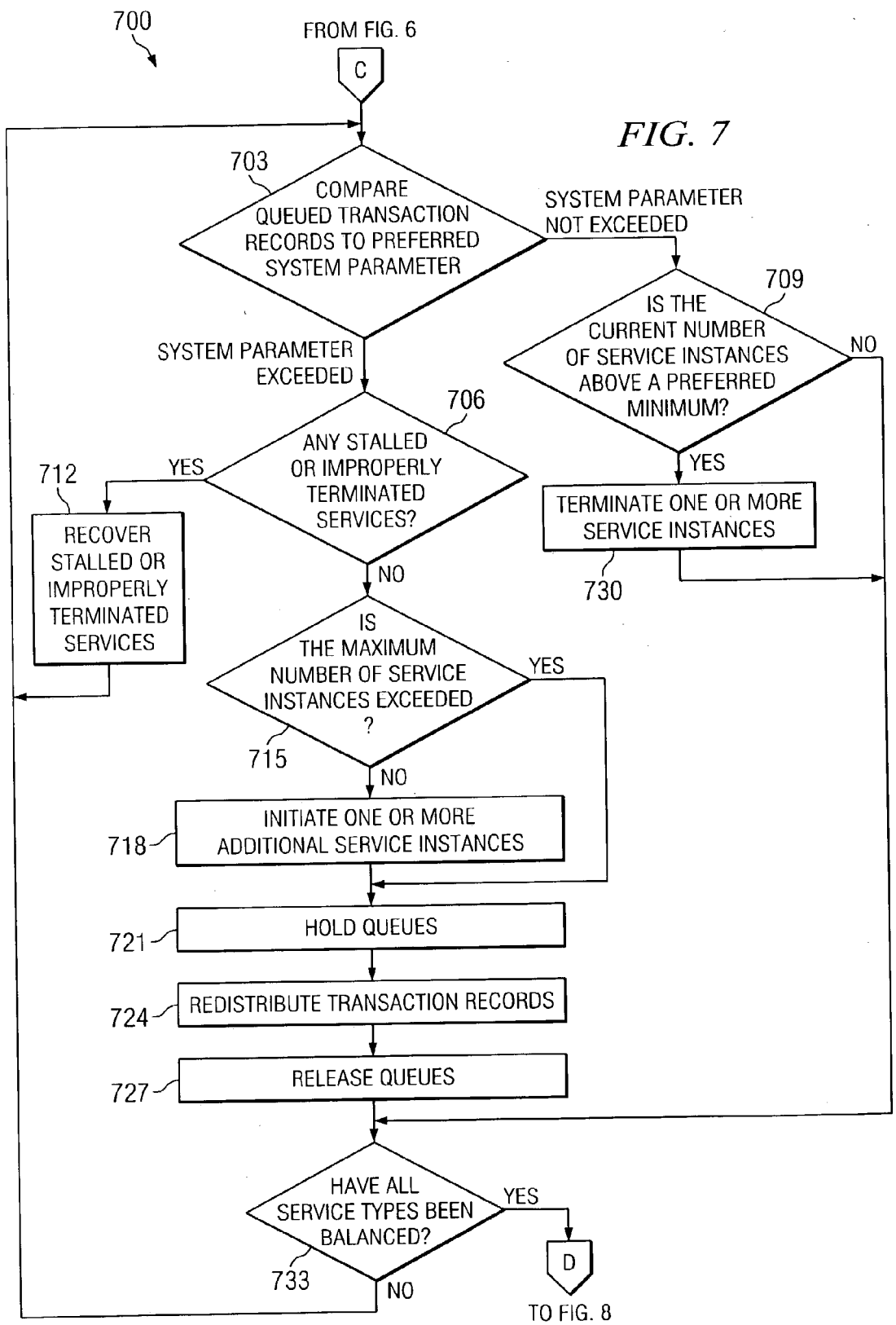

SYSTEM AND METHOD FOR PROCESSING HARDWARE OR SERVICE USAGE DATA

TECHNICAL FIELD OF THE INVENTION

The present invention relates generally to computer processing and, more particularly, to a high-volume data processing system and method.

BACKGROUND OF THE INVENTION

Many data processing systems operate according to rules-based management systems. The typical product of rules-based systems is a single data processing model containing comprehensive logic that represents all of the business rules for a particular line of business. Further, one consequence of such a program structure is that as each transaction or data record is received for processing, the comprehensive program will typically need to evaluate each business rule to determine its applicability to the current transaction or data record before performing any processing operations. As a result, processing transaction records becomes very hardware intensive and highly inefficient, especially in those rules-based program structures adapted to accommodate a wide variety of transaction record types. While rules-based management systems do provide for the easy incorporation of additional business logic, they typically do not achieve the levels of transaction or data record throughput desired and demanded by most high-volume data processing operations.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 is a flow diagram depicting one embodiment of a method for operating a service-based architecture in a data processing system according to teachings of the present invention;

FIG. 3 is a flow diagram illustrating one embodiment of a method for implementing a service control manager in a service-based architecture according to teachings of the present invention;

FIG. 4 is a flow diagram illustrating one embodiment of a method for launching a service control manager according to teachings of the present invention; and FIGS. 5-8 are flow diagrams illustrating one embodiment of a method for operating a service control manager in a service-based architecture according to teachings of the present invention.

DETAILED DESCRIPTION OF THE INVENTION

Preferred embodiments of the present disclosure and its advantages may be best understood by referring to FIGS. 1-8 of the drawings, wherein like numerals are used for like and corresponding parts of the various drawings.

Figure 1:
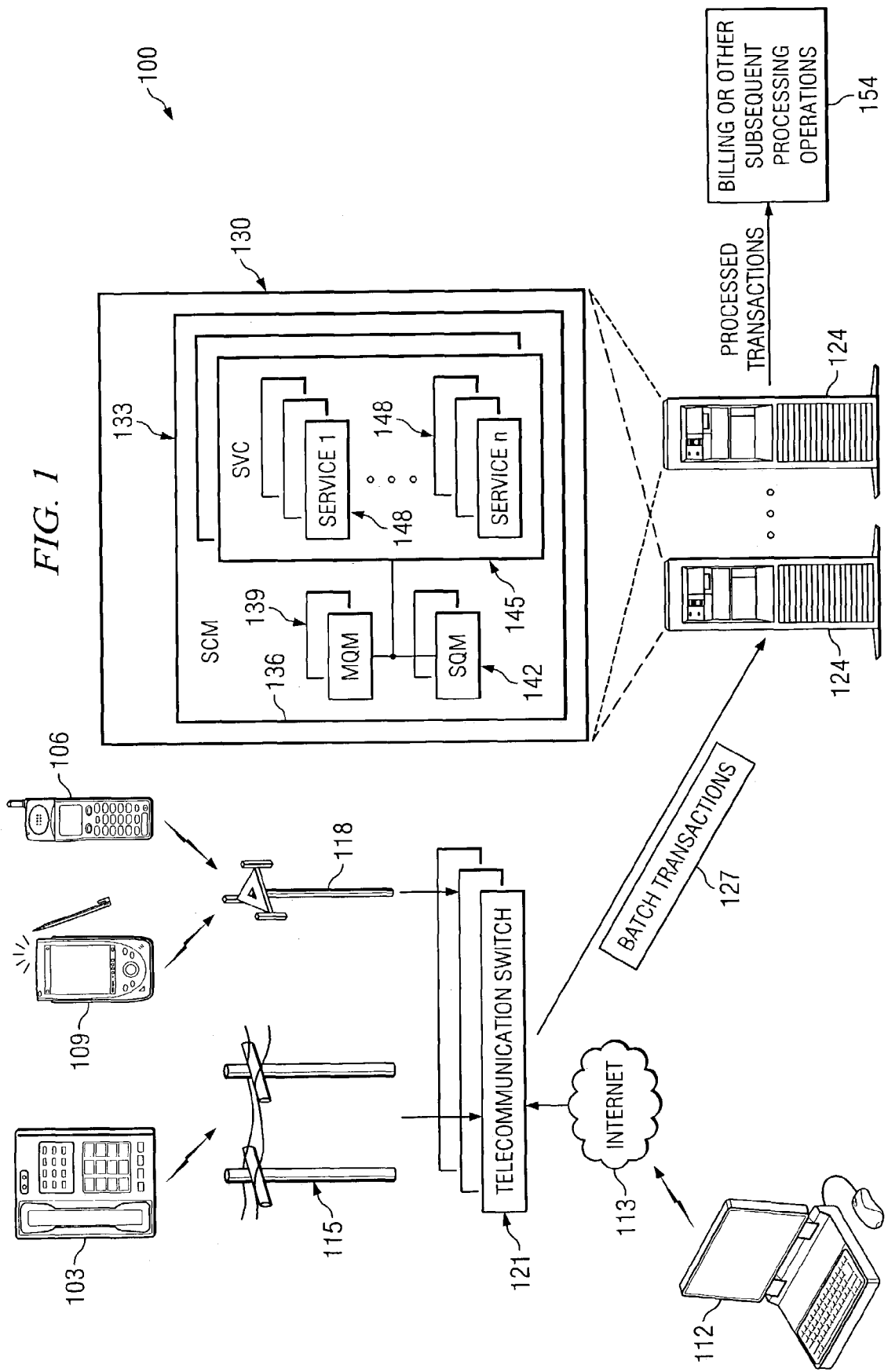
FIG. 1 is a schematic drawing generally depicting a data processing system incorporating teachings of the present invention and deployed in cooperation with a telecommunications network.

Referring first to FIG. 1, a diagram depicting one environment in which teachings of the present invention may be implemented is shown. In one aspect, the present invention is directed to enhancing the efficiency with which a high volume data processing system can process data, for example, telecommunications hardware or service usage transaction records. However, teachings of the present invention may be employed in data processing environments other than telecommunications systems including, but not limited to, retail transaction systems, accounting systems, point-of-sale systems, shipping systems, data caching systems, as well as others.

In a telecommunication system such as that illustrated generally in FIG. 1, the present invention may be employed to process telecommunication hardware or service usage transaction records from such sources as POTS (plain old telephone system) telephone 103, wireless telephone 106, wireless communications enabled PDA (personal digital assistant) 109 as well as computer system 112. Computer system 112 may communicate via a wireless or wireline Internet 113 as well as via other means. POTS telephone 103, wireless telephone 106 and PDA 109 may also be operable to communicate via Internet 113.

In typical operation, when POTS telephone 103, wireless telephone 106, PDA 109 or computing system 112 is employed or used in its respective communicative capacity via Internet 113, wireline communications 115, or wireless communications 118, one or more telecommunications hardware or service usage transaction records may be recorded by a telecommunications service provider. Telecommunication switches 121, or a computing component operating therewith, in a typical operating scenario, preferably accumulates the telecommunications hardware or service usage transaction records generated in response to the use of one or more of communication devices 103, 106, 109 or 112. Once a number of transaction records have been accumulated, or a predetermined reporting time has arrived, for example, telecommunications switch 121 or a computing component cooperating therewith preferably sends the accumulated records via batch transactions transmission 127 to one or more of data processing systems 124. Alternatively, instead of awaiting batch transaction transmission 127, one or more of data processing systems 124 may request or otherwise obtain the batch transaction records 127 from telecommunications switch 121. The transfer of data between telecommunications switch 121 and one or more of data processing systems 124 may be implemented via Internet 113, wireline communications 115, wireless communications 118, or other communication technologies, according to teachings of the present invention.

As commonly employed, telecommunication switch 121 is responsible for handling large volumes of telecommunication hardware or service usage transaction records. With respect to the batch transaction record transmission indicated generally at 127, data processing systems 124 are typically responsible for processing large quantities of transaction records from a defined set of transaction record types. According to teachings of the present invention, the efficiency with which data processing systems 124 process such large volumes of telecommunication transaction records may be enhanced by implementing, executing or otherwise maintaining a plurality processing services where each of the processing service instances is dedicated or specifically adapted to processing selected ones of the defined transaction record type set.

Although illustrated as tower computers, data processing systems 124 may assume a variety of forms. For example, data processing systems 124 may include a plurality of rack servers. In general, data processing systems 124 will preferably include one or more processor, memory, at least one communications port, one or more user input devices, one or more displays, as well as other components. Examples of data processing system 124 manufacturers include, but are not limited to, DELL, Hewlett Packard, Sun Microsystems and Apple.

In one embodiment of the present invention, as illustrated generally at 130, data processing systems 124 may enhance the efficiency with which they process transaction records or other data through the implementation of a service-based architecture. A service-based architecture may be defined as a data processing operation implemented such that it deploys a plurality of data processing service instances, where the service instances are dedicated to the processing of one or more selected transaction record types. One example of a service-based architecture implementation incorporating teachings of the present invention is depicted generally at 133 of FIG. 1.

Service-based architecture implementation 133, according to teachings of the present invention, preferably includes a service control manager 136 generally operable to supervise, manage or otherwise maintain the plurality of dedicated transaction record type processing service instances running or executing on data processing system 124. In operation, service control manager (SCM) 136 preferably cooperates with, employs or otherwise implements the preferred functionality of one or more message queue managers (MQM) 139, service queue managers (SQM) 142 and one or more service application management modules (SVC) 145.

As mentioned above, the present invention preferably implements a service-based architecture in that a plurality of individual services make up the processing architecture. Specifically, SCM 136, MQM 139, SQM 142 and SVC 145 are each preferably services forming a portion of the service-based architecture. Further representing the service-based architecture of the present invention is the implementation, in one embodiment, of a plurality of service instances each of which preferably includes all of the logic necessary to process a selected transaction record type, e.g., 911 transaction records, directory assistance transaction records, credit card transaction records, etc. In a further implementation, the transaction record processing service instances may be adapted to process a limited plurality of selected transaction record types where the limited plurality of transaction record types require substantially similar processing logic.

In a further aspect, as discussed herein, the service or processing objects of the present invention may be accumulated into like-type groups or groupings. For example, one or more 911 transaction record processing service instances may be organized into a single group. It is these grouping for which the message queue management and service queue management functions discussed herein may optimally be employed. By organizing groups of one or more service instances according to like-type transaction record processing capabilities, data processing system 124 may more readily adapt to changing workloads by adding or subtracting service instances to or from the group. These and other aspects of the present invention will be discussed in greater detail below.

In a preferred embodiment, each SVC 145 preferably includes a minimum number of service instances 148 dedicated or configured to process selected transaction record types. For example, SVC 145 may desire to maintain at least three (3) instances of a dedicated transaction record type service adapted to process 911 emergency calls, a minimum number of service instances dedicated or adapted to process transaction records resulting from directory assistance calls, one or more service instances for processing calls placed during peak/off-peak times, as well as service instances dedicated to the processing of other transaction record types.

Further, the one or more service instances 148 dedicated or configured to process one or more selected record types may each operate in accordance with an operating schedule. As such, in one aspect, having one or more service instances that remain substantially continuously available suggests that such service instances remain substantially continuously available within their scheduled time slots of operation.

For example, service instances operable to process transaction records of type 'E' may be scheduled to execute or run Monday through Friday during the hours of 6:00 AM to 7:00 PM, while service instances operable to process transaction records of type 'F' may be scheduled to run every Thursday during the hours of noon to 6:00 PM. Therefore, during the Monday through Friday, 6:00 AM to 7:00 PM, the service instances operable to process transaction records of type 'E' are preferably monitored and otherwise maintained such that they remain substantially continuously for the desired period.

In further embodiments, selected service instances may be scheduled to run monthly, bimonthly, semi-annually, annually, etc., as well as not to run on selected dates or not to run on selected recurring dates. Each of the successive scheduled service instances is preferably assigned a priority to ensure its preferred processing. As will be discussed in greater detail below, the scheduling of the various service instances as well as any associated priority processing is preferably maintained by SCM 136.

In the event a transaction record is received for which a service instance 148 is not currently active, available or running, SCM 136, MQM 139, SQM 142 and/or SVC 145 may be adapted to initiate a transaction record processing service adapted to process the record type. The transaction record processing service may be called upon receipt of such transaction records, according to a defined schedule, in response to accumulation of a number of such transaction records, or otherwise.

SQM 142, in one aspect of the present invention, is preferably adapted to adjust or otherwise manage one or more service queues associated with a corresponding service instance 148. Service queues may be defined as queues which are operable to maintain for processing transaction records received from a message queue associated with the grouping of like-type transaction record processing service instances. Among the operations preferably effected by SQM 142 is the balancing of queued transaction records across or among the active service instances available for processing the specific transaction record types, e.g., across the grouped instances of 911 transaction record processing services. SQM 142 may be further adapted to perform additional operations.

MQM 139 preferably cooperates with SQM 142, in part, to further increase the efficiency with which the various service instances process queued transaction records. Among other operations, MQM 139 preferably prepares, readies or otherwise initiates one or more services adapted to manipulate the message queues associated with the one or more groups or groupings of service instances directed to processing a selected transaction record type. In one aspect, MQM 139 may be adapted to prioritize messages, e.g., transaction, service instance cancellation messages, etc., within associated service queues MQM 139 may also be adapted to initiate additional service instances in response to a backlog in one or more message or service queues, as well as to execute or cancel other services according to a service schedule. Further detail regarding the operation and cooperation of SCM 136, MQM 139, SQM 142 and SVC 145 will be discussed below.

In the telecommunication transaction record processing system example of FIG. 1, data processing system 124 may be employed to perform one or more preprocessing operations.

For example, the batch transaction records processed by data processing systems 124 may subsequently be passed on to a billing statement process or other subsequent transaction record processing operation 154.

Referring now to FIG. 2, a flow diagram illustrating one embodiment of a method for implementing a service-based architecture is indicated generally at 200. According to teachings of the present invention, implementation of a service-based architecture preferably includes maintaining a plurality of service instances operable to process selected types of transaction records. Preferably, the plurality of service instances are available on one or more of data processing systems 124, as indicated at 203, on a substantially continuous basis. For example, one or more of data processing systems 124 may substantially continuously execute or run one or more telecommunication service or hardware usage transaction record processing services for each of transaction record types 'A'-'M', for a total of (n) record type services.

At 206, a service-based architecture incorporating teachings of the present invention preferably enables the queuing of transaction records according to transaction record type to a queue associated with a respective dedicated transaction record type processing service instance or grouping of service instances. For example, each type 'E' transaction record will preferably be queued to a message or service queue associated with a group having one or more service instances directed or dedicated to processing type 'E' transaction records.

At 209, when a transaction record type processing group or grouping includes a plurality of service instances, the present invention preferably enables the queued transaction records to be balanced across or among the plurality of service instances such that more efficient data processing may be achieved. Initial balancing and balancing as-needed generally enhances the efficiency with which data processing system 124 manages the service instances it maintains and completes it designated tasks.

At 212, the queued transaction records may be processed in accordance with their associated transaction record processing service. Upon completion of the processing operations, the processed transaction records may then pass to one or more subsequent operating centers, such as a billing operations center 154 of FIG. 1.

As mentioned above, the present invention may be employed in a variety of data processing systems. In one possible system, telecommunications system 100, transaction records may be created and received in a variety of formats. One format which is typically produced in a telecommunications system such as system 100 is the Automated Message Accounting (AMA) format from Telecordia and is employed by most telecommunications carriers. Other formats, such as EMI (Exchange Message Interface) records, may also be employed with the present invention. Further, the present invention may be employed with other transaction record formats, such as a format developed to track downloads or other operations performed by computer 112 via Internet, private network or other network connections 113.

Referring now to FIG. 3, a flow diagram depicting one embodiment of a method for implementing SCM 136 is shown. In method 300 of FIG. 3, after initialization of data processing system 124 at 303, SCM 136 may be launched at 306. Additional details regarding the launch of SCM 136 are discussed with reference to FIG. 4.

Once SCM 136 has been launched, method 300 preferably proceeds to 309 where one or more service instances currently or recently operating on data processing system 124 may be recovered, preferably by SCM 136. After completing its recovery operations, SCM 136 preferably enters its normal operating mode at 312.

SCM 136 may be configured such that it returns to 309 or 312 after completing its normal operating procedures at 315. Alternatively, SCM 136 may be adapted to rest or sleep for a predetermined period after the passing of which it may return to a prior operation, e.g., 309 or 312, in method 300. Additional detail regarding the launch, recovery, and normal operating mode of SCM 136 will be discussed in greater detail below with respect to FIGS. 4-8.

In general, FIGS. 4-8 disclose one embodiment of a preferred operating cycle of a data processing system incorporating teachings of the present invention. It should be understood that FIGS. 4-8 primarily discuss one method but that many variations in may be made without departing from the spirit and scope of the present invention.

Referring now to FIG. 4, one embodiment of the operations preferably associated with the launch of SCM 136, are shown generally at 400. As illustrated in FIG. 4, after the launch of SCM 136 at 403, method 400 may proceed to 406 where SQM 142 is preferably launched.

In one embodiment, SQM 142 preferably includes one or more services which may be called from SCM 136 or from one or more other data processing system 124 services. The services included in SQM 142 are preferably operable to manipulate, maintain or otherwise manage one or more service queues associated with the active or existing transaction record processing service instances. In addition, the services of SQM 142 may also be adapted to provide information regarding one or more aspects of the transaction record processing service queues. For example, one ore more services of SQM 142 may be operable to determine the number of transaction records remaining in a service queue, determine the throughput of a service queue as well as perform other operations.

At 409 of method 400, MQM 139 may be launched. According to teachings of the present invention, MQM 139 preferably includes one or more services which may be called from SCM 136 or from one or more transaction record processing service instances. The one or more services included in MQM 139 are preferably adapted to manipulate or provide information regarding the one or more message queues associated with the groupings of or individual service instances running in the service-based architecture of the present invention.

In one aspect, MQM 139 is preferably operable to prioritize transaction records queued for processing. For example, MQM 139 may be enabled to reorder a message or service queue to cause priority designated transaction records to be processed first and the remaining transaction records to be processed according to a FIFO (first-in-first-out) or other method. In another aspect, MQM 139 may be adapted to initiate additional service instances if it is determined that the number of transaction records in a service or message queue for a given record type service group exceeds a desired performance parameter. More detail regarding the operation and cooperation of SCM 136, MQM 139, SQM 142 and SVC 145 is described below.

SVC 145 may be launched at 412 of FIG. 4. MQM 139, SQM 142 and 145 may be launched in any order or substantially simultaneously, according to teachings of the present invention. SVC 145 preferably includes one or more services that may be called upon to serve one or more transaction record processing needs of data processing system 124. Each of the services included in SVC 145 preferably include all of the logic necessary to process the transaction record types associated with a particular service. After the launch of MQM 139, SQM 142 and SVC 145, method 400 preferably proceeds to method 500 of FIG. 5.

Beginning at 503, after launch or initiation as described above, SCM 136 preferably initiates and effects the recovery of any stalled service instances. A stalled service instance may include, but is not limited to, those service instances which have ceased processing for reasons other than a command to terminate. Recovery of a stalled service instance may involve restarting the service instance and its associated service queue, removing any unprocessed transaction records from the instance's service queue for processing by another service instance as well as performing other operations. Upon completion of stalled service instance recovery at 503, method 500 preferably proceeds to 506.

At 506, SCM 136 preferably effects the recovery of any terminated transaction service instances. Terminated services instances which SCM 136 may desire to recover include, for example, any service instances or queues which were terminated before completing processing of one or more queued transaction records. Other definitions of recovered terminated services instances may be employed in the present invention. In addition, other termination events may be addressed and recovered by SCM 136. Upon completion of terminated service instance recovery at 506, method 500 preferably proceeds to 509.

At 509, SCM 136 preferably begins a process of verifying all existing or active service instances. As mentioned above, there is a preference that a data processing system 124 operating in accordance with teachings of the present invention maintain, in addition to SCM 136, MQM 139, SQM 142 and SVC 145, a minimum number of service instances adapted to the processing of one or more selected transaction record types, running or executing substantially continuously. Accordingly, at 509, SCM 136 preferably determines the number of active instances of each transaction record service type currently available on data processing system 124.

For each type of transaction record service instance counted at 509, SCM 136 preferably compares the total number of such active service instances to its respective preferred minimum number of service instances selected to remain substantially continuously available on data processing system 124 at 512. If it is determined that the total number of active instances of the particular transaction type service under evaluation matches the preferred minimum number of such service instances selected to remain substantially continuously available at 512, method 500 preferably proceeds to 515. If it is determined at 512 that the number of active instances of the current transaction type service is below the preferred number of service instances for such service type, method 500 preferably proceeds to 518. Finally, if it is determined at 512 that too many active instances of the current service type are available, method 500 preferably proceeds to 521.

At 518, in response to too few instances of a particular transaction type service, SCM 136 will preferably initiate an additional number of transaction record service instances to bring the number of active service instances into accordance with the preferred minimum. Following initiation of the additional transaction record service instances at 518, method 500 preferably proceeds to 515.

Alternatively, at 521, in response to a determination of too many active service instances of a given type, SCM 136 may initiate the cancellation of one or more of the excess service instances. Once an appropriate number of transaction record service instances have been cancelled at 518, method 500 preferably proceeds to 515.

At 515, a determination may be made, preferably by SCM 136, as to whether all types of currently available or active transaction record service instances have been reviewed for their compliance with their respective preferred minimums. In the event all types of currently available transaction record service instances have not been reviewed, method 500 preferably returns to 509 where the next group of instances of a particular transaction record service type may be evaluated for its compliance with a corresponding number of service instances preferably substantially continuously available. Alternatively, if it is determined at 515 that all currently available service types have been reviewed for their compliance with their respective preferred numbers of active service instances, method 500 preferably proceeds to 524.

At 524, SCM 136 may determine whether each of the transaction record service types selected to remain substantially continuously available on data processing system 124 is active and/or available. If it is determined at 524 that each of the dedicated transaction record service types selected to remain substantially continuously available are not currently available, method 500 preferably proceeds to 527 where the preferred minimum number of instances for a currently unavailable transaction record service type may be identified. Proceeding then to 530, the minimum number of service instances for the unavailable service type identified at 527 may be activated, initiated or otherwise made available. Upon initiation of the currently inactive transaction record service instances at 530 or upon the determination at 524 that each of the transaction record service types selected to remain substantially continuously available is made, method 500 preferably proceeds to 533.

At 533, operation of the queues, message and/or service, associated with each of the groupings of one or more transaction record service instances may be paused or placed on hold. Holding each of the queues associated with the dedicated transaction record service instance groupings may occur substantially simultaneously, substantially sequentially, or otherwise. Once each of the queues has been paused or placed on hold, any queued transaction records may be balanced or distributed across the service instances of each corresponding service type grouping at 536. As mentioned above, queue management may be effected by SQM 142 or MQM 139, preferably as instructed or coordinated by SCM 136. Further, in holding or pausing the service or message queues, processing by the service instance of a current transaction record may also be paused, be permitted to complete or continue unabated.

After balancing or redistribution of the queued transaction records at 536, the service instances designated for cancellation at 518 may be appropriately cancelled at 539. Cancellation of one or more service instances may occur, for example, by SCM 136 inserting in a service queue associated with each service instance to be cancelled a cancellation instruction whereby the service instance will be cancelled or ended upon completion of its current service queue load and the subsequent processing of the cancellation instruction. Other methods for canceling a service instance may be employed without departing from the spirit and scope of the present invention. Upon redistribution or balancing of the queued transaction records and the insertion of any desired cancellation instructions at 536 and 539, respectively, the queues are preferably released such that processing of the transaction records may resume at 542.

Following release of the queues and the return to processing of the service instances, SCM 136 preferably updates a service registry to indicate each instance, type and other information regarding the services running on data processing system 124 at 545. As suggested, a service registry operating in accordance with the service-based architecture of the present invention may track the varied types of service instances active on data processing system 124, the number of instances in each service type grouping, a termination status for one or more service instances or groups, when one or more service instances or groups will awake from a sleep state, as well as other information. After updating the service registry as desired at 545, SCM 136 preferably proceeds to 548 where it may loop, sleep or remain in a wait state until its next processing period, event or occurrence.

From loop or wait state 548, upon arrival of the next SCM 136 processing period, method 500 preferably proceeds to 551 where it may be determined whether data processing system 124 is in a recovery mode, other than the 'recovery mode' which occurs at initialization, or its normal operating mode. If it is determined that data processing system 124 is in a recovery mode, such as a recovery mode resulting from one or more system malfunctions, software updates, etc., method 500 preferably returns to 503 where SCM 136 may begin its service recovery operations. Alternatively, if it is determined that data processing system 124 is in a normal operating mode, method 500 preferably proceeds to method 600 of FIG. 6.

Figure 5:
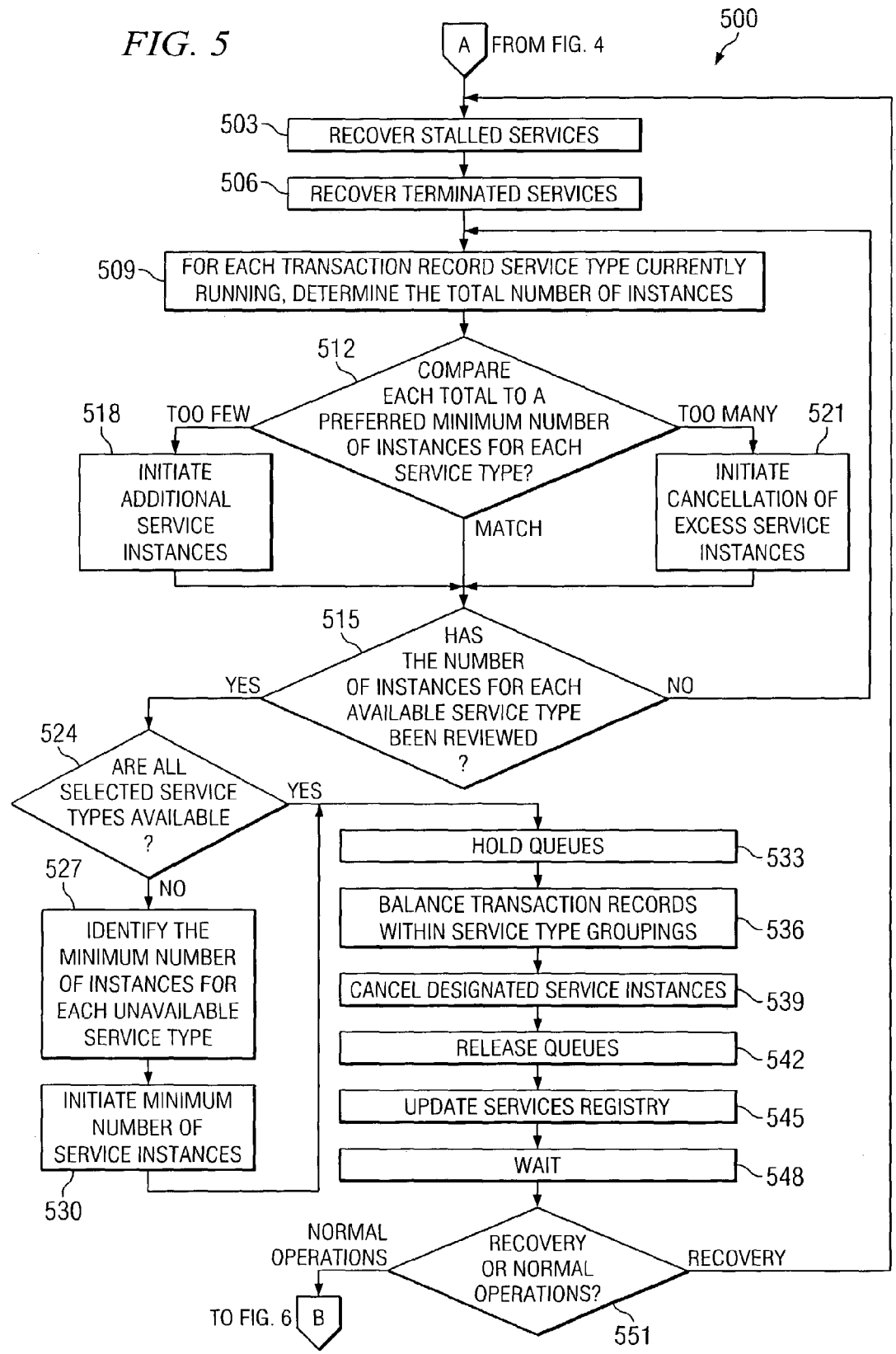
Figure 6:
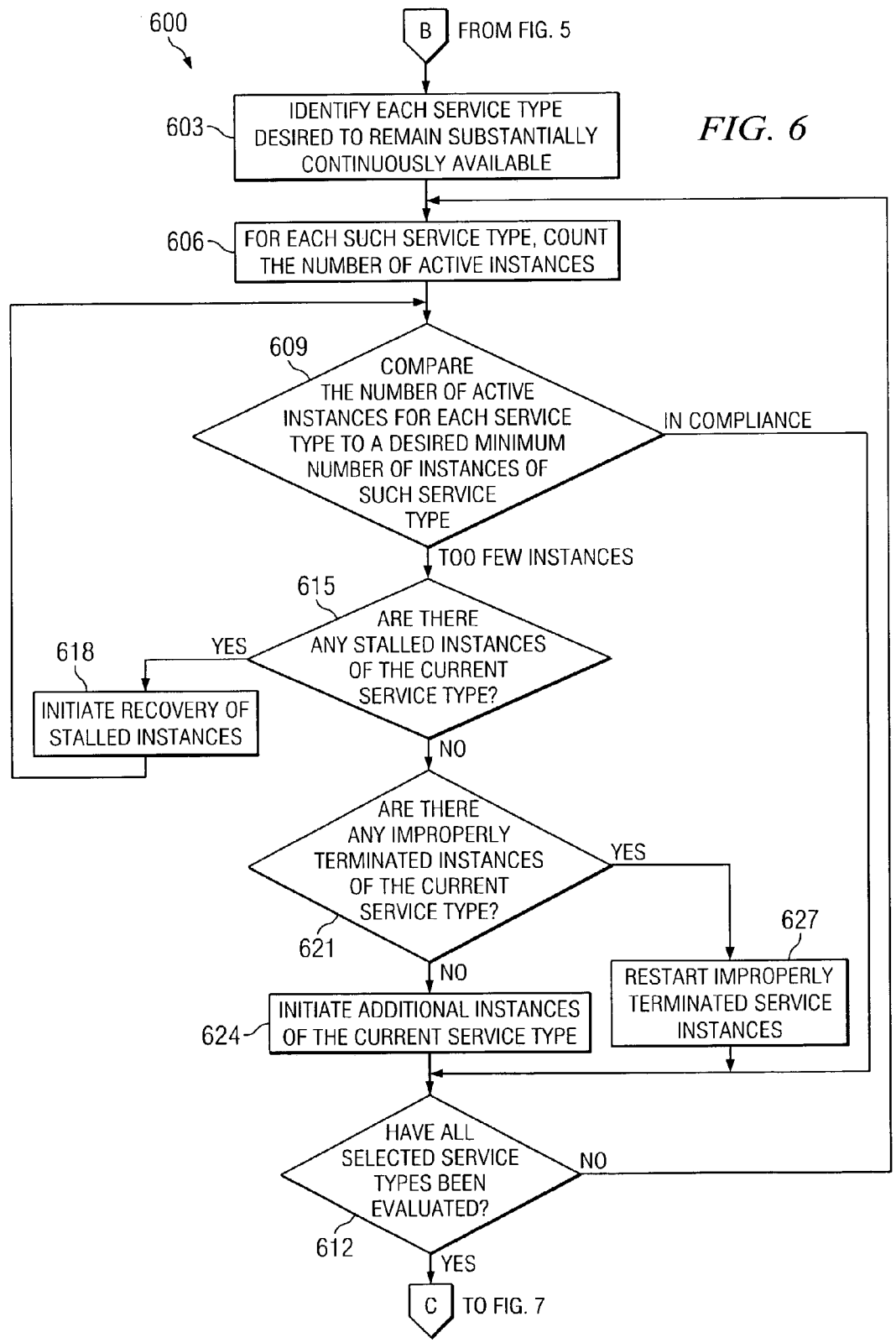

In one embodiment of the present invention, as will be discussed below, the 'normal operating mode' of data processing system 124 and SCM 136, as depicted generally in FIGS. 6, 7 and 8, repeats or includes many of the operations preferably performed during the 'recovery mode' illustrated generally at 500 in FIG. 5. It should be understood that operations other than those of the recovery mode 500 may be incorporated into a 'normal operating mode' without departing from the spirit and scope of the present invention.

At 603 of method 600, SCM 136 preferably identifies those dedicated transaction record service types selected to remain substantially continuously available on data processing system 124. The services selected to remain substantially continuously available may be maintained by a service registry, by setting a bit on one or more service calls, in a data file or in another useful by data processing system 124 and SCM 136.

At 606, SCM 136 preferably checks or counts the number of active instances for each of the service types selected to remain substantially continuously available. In one embodiment, an active service instance may be defined as a service instance currently processing one or more transaction records, a service instance substantially immediately available to process one or more transaction records or a service instance awaiting receipt of one or more transaction records for processing. Other definitions or descriptions of an active service instance may be used without departing from the spirit and scope of the present invention.

At 609, after obtaining an active service instance count at 606, the preferred number of active instances for each service type selected to remain substantially continuously available may be obtained by SCM 136. Subsequently, SCM 136 may also determine whether the number of active service instances for each selected service type is in accordance with the preferred number of service instances for that particular service type. If it is determined at 609 that the number of active service instances for a particular service type is in accordance with the desired minimum number of service instances, method 600 preferably proceeds to 612. However, if at 609 it has been determined that the number of active service instances for a particular service type is not in accordance with the preferred number of such service instances, method 600 preferably proceeds to 615 where SCM 136 may interrogate data processing system 124 to ascertain the presence of any stalled instances of the current service type.

At 612, a determination may be made as to whether all service types selected to remain substantially continuously available have been verified or checked for their compliance with the preferred number of such service instances. If all selected service types have not been checked, method 600 preferably returns to 606 where the next service type identified as a service selected to remain substantially continuously available may be evaluated for compliance with its preferred number of instances. Alternatively, if all selected service types have been evaluated, method 600 may proceed to method 700 of FIG. 7.

At 615, if SCM 136 identifies any stalled instances of the current service type, method 600 preferably proceeds to 618 where SCM 136 may initiate recovery of such stalled service instances before returning to 609. Alternatively, if it is determined at 615 that there are no stalled instances of the current service type, method 600 may proceed to 621 where SCM 136 may interrogate data processing system 124 to ascertain whether there exists any improperly terminated instances of the current service type.

If SCM 136 determines at 621 that data processing system 124 contains no improperly terminated instances of the current service type, method 600 may proceed to 624 where SCM 136 preferably initiates an appropriate number of instances for the current service type. Alternatively, should SCM 136 identify one or more improperly terminated instances of the current service type at 621, method 600 preferably proceeds to 627 where SCM 136 may initiate the recovery of the improperly terminated instances.

Upon initiation of an appropriate number of current service type instances at 624, or upon completion of the recovery of any improperly terminated instances of the current service type at 627, method 600 preferably returns to 612 where, as mentioned above, SCM 136 may determine whether each of the service types selected to remain substantially continuously available has been evaluated. Once all services selected to remain substantially continuously available have been evaluated in accordance with method 600, method 600 preferably proceeds to method 700 of FIG. 7.

Illustrated generally at 700 in FIG. 7 is a flow diagram depicting one manner in which teachings of the present invention may enhance the efficiency with which data processing system 124 processes transaction records received, for example, from telecommunications switch 121. In general, SCM 136 preferably timely monitors the processing operation of each service type grouping to ensure that each is performing in accordance with one or more system performance parameters. Accordingly, method 700 can be understood to run as sequenced in FIGS. 3-8. Alternatively, method 700 can be understood to run appropriately after receipt of batch transaction transmission 127 and upon subsequent distribution or allocation of the transaction records to their respective transaction record service type instances or transaction type groups.

After receipt and distribution or allocation of the transaction records received from telecommunications switch 121, or upon completion of method 600, SCM 136 preferably begins method 700 at 703. At 703, SCM 136 may compare the number of transaction records in one or more message or service queues associated with a selected transaction type service group to a preferred system performance parameter, such as a queue throughput or queue volume. As mentioned above, MQM 139 and SQM 142 are preferably adapted to manipulate and provide information on message and service queues, respectively. If at 703 SCM 136 determines that the number of transaction records in a queue associated with a group or individual instance of a particular dedicated transaction type service exceeds a preferred system performance parameter, method 700 may proceed to 706. Alternatively, if SCM 136 determines that the number of queued transaction records associated with a particular transaction type service group or individual service instance matches or is below the preferred system performance parameter, method 700 may proceed to 709.

At 706, SCM 136 may again interrogate data processing system 124 to determine whether any stalled or improperly terminated service instances or queues associated with the transaction type under evaluation exist. If one or more stalled or improperly terminated service instances, groupings or queues are identified, method 700 preferably proceeds to 712 where the improperly terminated or stalled groups, queues or instances may be recovered before returning to 703. In an alternate embodiment, upon recovery of any improperly terminated or stalled queues, groups or instance, method 700 may instead proceed from 712 to 721 for processing as described below.

If it is determined at 706 that there exist no stalled or improperly terminated service queues or instances, method 700 may proceed to 715 where the total number of active service instances adapted to process the current transaction type may be compared to a preferred system limit on such service type instances. To avoid strangling data processing system 124 when an unexpectedly large number of transaction records of a particular type are received, the present invention may incorporate a limit to the number of instances of any one service type that may be running at one time. If the maximum number of allowed service instances is not exceeded at 715, method 700 preferably proceeds to 718 where one or more additional service instances may be initiated. From 718, method 700 will preferably proceed to 721.

At 721, 724 and 727, operations similar to the balancing or redistribution operations discussed above with reference to FIG. 5 may be effected. Specifically, each of the queues associated with the current service type being reviewed may be paused or held at 721. Once the selected queues have been paused or held, the transaction records remaining in the queues to be processed may be substantially equally distributed across each of the active service queues and/or instances for the current transaction type at 724. After distribution or balancing, the queues and service instances may be released for normal processing operation at 727. If all service types have been balanced, as determined at 733, method 700 may proceed to method 800 of FIG. 8, otherwise, method 700 preferably returns to 703.

At 709, in response to a queue being in accordance with one or more system parameters, SCM 136 may compare the number of available service instances for processing the current transaction record type to a minimum number of such service type instances selected to remain substantially continuously available on data processing system 124. If the number of such available service instances is in accordance with the preferred minimum, method 700 may proceed to 733 for performance of the operations described above. However, if it is determined at 709 that the number of such service instances exceeds the minimum number of service type instances selected to remain substantially continuously available, method 700 may proceed from 709 to 730 where one or more of the service instances may be terminated upon completion of its current processing load. In one aspect, eliminating excess service instances may free up system resources such that additional instances of other service types may be initiated or such that data processing system 124 may dynamically adjust it resource consumption. Method 700 may then proceed to 733 for processing as described above.

In an alternate embodiment of the present invention, before method 700 proceeds from 709 to 730, balancing operations similar to those performed at 721, holding the queues, and 724, distributing the transaction records across active service instances and queues, may be effected. Further, before method 700 proceeds from 730 to 733, a balancing operation similar to that of 727, releasing the held queues, may be performed. Adding operations similar to those of 721, 724 and 727 preferably effects the balancing of the transaction record loads in each queue associated with each service type instance or service type grouping. Still other embodiments of method 700 may be incorporated in the present invention without departing from its spirit and scope.

Method 800 of FIG. 8 generally illustrates a scheduling capability preferably implemented by SCM 136 and MQM 139, according to teachings of the present invention. In one embodiment of the present invention, SCM 136 may cooperate with MQM 139 to effect as-needed operation of one or more service types. In an alternate embodiment, MQM 139 may perform the bulk of the operations necessary to effect as-needed service calls. As-needed service operation may include, but is not limited to, initiating or canceling service instances according to a service schedule and initiating service instances in response to receipt of one or more transaction types for which a service instance is selected to remain substantially continuously available.

At 803, SCM 136 or MQM 139 may access a system clock or other hardware available on data processing system 124 to determine the current time. With a determination of the current time, SCM 136 may proceed to 806 for the review of a service initiation or cancellation schedule to determine if one or more events are scheduled for execution. Alternatively or in addition, SCM 136 or MQM 139 may consult a queue holding transaction record for which there is no active service instance available.

If the time has arrived for one or more services to be initiated or cancelled or a number of transaction records without an active service instance available to process them have accumulated, method 800 preferably proceeds to 809 where SCM 136 may take the appropriate initiation or cancellation action. Upon effecting the scheduled events identified at 806 and initiated at 809, or in response to an absence of scheduled events, method 800 preferably returns to 548 of FIG. 5 where SCM 136 may loop or pause in a wait state.

Although the present invention and its advantages have been described in detail, it should be understood that various changes, substitutions, and alterations may be made hereto without departing from the spirit and scope of the invention as defined by the following claims. For example, the active service instances may be adapted to sleep upon completion of queue processing, queue balancing may be effected in a manner that takes into account the complexity of transaction records waiting in each queue, the various benchmarks, metrics, performance parameters, throughput measures, etc., may be preset values or dynamically determined according to assorted processing characteristics over time, data, program or other information refreshes may be implemented in conjunction with the varied transaction record processing disclosed herein and the data processing system of the present invention may be implemented over a number of computer systems spanning a number of processing centers. Still other alterations are possible.

What is claimed is:

1. A method for processing telecommunications hardware and service usage transaction records, comprising:

maintaining availability of a minimum number of each of a plurality of service instances, each of the plurality of service instances adapted to process telecommunication transaction records of a corresponding one of a plurality of different telecommunication transaction types, each different telecommunication transaction type comprising a different type of telecommunication transaction made by customers, wherein the predetermined minimum number is a function of a predetermined schedule;

organizing the plurality of service instances into service groupings of one or more service instances according to the telecommunications transaction type corresponding to each service instance, such that each service grouping corresponds to a particular telecommunications transaction type;

providing a message queue for each grouping, the message queues operable to maintain and prioritize received telecommunication transaction records;

providing a service queue for each service instance, the service queues operable to maintain telecommunication transaction records for processing in accordance with the associated service instance;

receiving batch telecommunications transaction records regarding telecommunication transactions made by customers;

distributing the telecommunication transaction records according to telecommunication transaction type among the message queues of the corresponding service groupings;

prioritizing, in the message queues, the telecommunication transaction records for processing according to a telecommunication transaction record priority designation;

balancing the telecommunication transaction records from the message queues across the service queues associated with each service instance in the service grouping receiving telecommunication transaction records;

monitoring service grouping performance to determine whether the monitored service grouping is performing in accordance with a system performance parameter;

adjusting the service instances of a service grouping failing to perform in accordance with the system performance parameter;

for a particular transaction type, comparing the number of currently running service instances corresponding to a particular transaction type to a predetermined minimum plural number of instances for that particular transaction type;

if a number of currently running service instances corresponding to the particular transaction type is below the predetermined minimum number, initiating one or more additional service instances corresponding to the particular transaction type;

queuing telecommunication transaction records of a telecommunication transaction type for which a service instance corresponding to that telecommunication transaction type is unavailable; and initiating at least one service instance corresponding to the queued telecommunication transaction records in response to a queued transaction accumulation.

2. A computer memory including computer executable instructions, the instructions operable to:

maintain a plurality of service groups, each service group corresponding to a particular one of a plurality of different transaction types and including one or more respective service instances adapted to process transaction records of that particular transaction type, wherein transaction records comprise records regarding transactions made by customers, and wherein each of the different customer transaction types comprises a different type of transaction made by customers;

for a particular transaction type, identify a minimum number of service instances, wherein the minimum number is based on a predetermined schedule;

for a particular transaction type, compare the number of currently running service instances corresponding to a particular transaction type to the predetermined minimum plural number of instances for that particular transaction type;

if a number of currently running service instances corresponding to the particular transaction type is below the predetermined minimum number, initiate one or more additional service instances corresponding to the particular transaction type;

queue a batch of transaction records according to transaction type to a corresponding service group;

balance the transaction records across the service instances of a service group; and process the queued transaction records in accordance with each associated transaction type service instance; and disable one or more service instances corresponding to the particular transaction type in response to identification of excess processing capacity for the particular transaction type.

3. The computer memory of claim 2, the instructions further comprising instructions operable to monitor one or more queues associated with each service group to determine whether the service group is performing in accordance with a system performance parameter.

4. The computer memory of claim 3, the instructions further comprising instructions operable to adjust the service instances of a group in response to a failure of the group to perform in accordance with the system performance parameter.

5. The computer memory of claim 4, the instructions further comprising instructions operable to re-balance the queued transaction records across the service instances of an adjusted service group.

6. The computer memory of claim 5, the instructions further comprising instructions operable to repeat the monitor, adjust and re-balance operations until each monitored group performs in accordance with the system performance parameter.

7. The computer memory of claim 2, the instructions further comprising instructions operable to monitor one or more queues associated with a service instance to determine whether the service instance is performing in accordance with a transaction record processing performance parameter.

8. The computer memory of claim 7, the instructions further comprising instructions operable to initiate additional service instances in response to a failure by the service instance to perform in accordance with the transaction record processing performance parameter.

9. The computer memory of claim 2, the instructions further comprising instructions operable to:

receive a change to one or more system performance parameters; and implement each change real-time such that the changed system performance parameter may be used in subsequent monitoring of performance.

10. The computer memory of claim 2, further comprising each service group and associated service instances adapted to perform substantially all necessary processing of the corresponding transaction type.

11. The computer memory of claim 2, the instructions further comprising instructions operable to restore stalled and improperly terminated service instances.

12. The computer memory of claim 2, the instructions further comprising instructions operable to execute selected service instances in accordance with a service schedule.

13. A data processing system, comprising:
at least one processor;
at least one memory operably coupled to the processor; and
instructions stored in the memory and executable in the processor, the instructions operable to:
maintain substantially continuous availability of a plurality of service instances, each of the plurality of service instances adapted to process transaction records of a corresponding one of a plurality of different transaction types, each different transaction type comprising a different type of transaction made by customers;
for a particular transaction type, compare a number of currently running service instances corresponding to a particular transaction type to a predetermined minimum plural number of instances for that particular transaction type, wherein the predetermined minimum number is based on a predetermined schedule;
if the number of currently running service instances corresponding to the particular transaction type is below the predetermined minimum number, initiate one or more additional service instances corresponding to the particular transaction type;
distribute received transaction records to corresponding service instances according to the transaction type of each transaction record;
adjust the service instances adapted to process transaction records of a particular transaction type in response to failure of the corresponding service instances to perform in accordance with a system performance parameter;
redistribute data across the adjusted service instances; and
disable one or more service instances corresponding to the particular transaction type in response to identification of excess processing capacity for the particular transaction type.

14. The data processing system of claim 13, the instructions further comprising instructions operable to balance the transaction records of a particular transaction type substantially equally across a plurality of service instances corresponding to that transaction type.

15. The data processing system of claim 13, the instructions further comprising instructions operable to:
organize the service instances according to transaction type into groups of one or more; and
provide a message queue for each group of service instances, the message queue operable to receive transaction records of the transaction type corresponding to that group of service instances upon distribution.

16. The data processing system of claim 15, further wherein the message queue is further operable to prioritize transaction records for processing.

17. The data processing system of claim 13, the instructions further comprising instructions operable to provide a service queue operable to receive and maintain transaction records distributed to each service instance.

18. The system of claim 13, the instructions further comprising instructions operable to:
monitor service instance performance; and
initiate at least one additional service instance in response to failure of a service instance to perform in accordance with a performance parameter.

19. The data processing system of claim 13, the instructions further comprising instructions operable to maintain, for each of one or more transaction types, substantially continuous availability of a minimum number of service instances corresponding to that transaction type.

* * * * *